United States Patent Office 3,214,474
Patented Oct. 26, 1965

3,214,474
PREPARATION OF UNSYMMETRICAL
HYDRAZINES
Karl Klager, Monrovia, Calif., assignor to Aerojet-General Corporation, Azusa, Calif., a corporation of Ohio
No Drawing. Filed Sept. 28, 1953, Ser. No. 382,828
6 Claims. (Cl. 260—583)

This invention relates to an improved process for preparing unsymmetrical alkyl hydrazines.

Unsymmetrical alkyl hydrazines have been known for many years and their properties as fuels have been well recognized in the art. However all of the known processes for their production produce poor yields of low purity. Accordingly, the use of alkyl hydrazines as fuels, in particular as propellant fuels, has been somewhat restricted for economic as well as for safety reasons, since a high degree of purity is required for this use in order to lessen the possibility of explosive reactions.

It is an object of this invention to provide an improved method for the preparation of unsymmetrical alkyl hydrazines which will provide increased yields of greater purity.

Classically unsymmetrical alkyl hydrazines are prepared by the reduction of nitroso dialkylamines. This reaction proceeds in accordance with the reaction scheme set forth below:

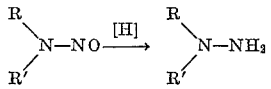

wherein R and R' are the same or different alkyl radicals. However, it is known that the hydrazine bond may be dissolved under reductive conditions, this reaction taking place according to the following reaction scheme:

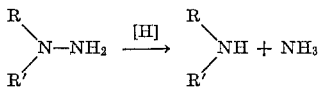

where R and R' are the same as above.

Hence it becomes apparent that a catalyst or set of reaction conditions which favors the former reaction and disfavors the latter will result in a successful method for the preparation of such substituted hydrazines.

Alkyl hydrazines have been prepared by reducing the nitroso group in the classical manner with zinc and acetic acid, however these conditions usually result in a complicated work up, a yield of approximately 65%, and in a product of relatively low purity.

In recent years it has been found that lithium aluminum hydride may also be employed to effect this reaction. However the lithium aluminum hydride method is very expensive, ordinarily yields a product of low purity and generally provides a theoretical yield of only about 75%.

We have discovered that by using palladium catalysts to effect the reduction, a yield of approximately 85% of the theoretical may be obtained and that the product thus obtained possesses a high degree of purity. Suitable palladium catalysts are: palladium charcoal, palladium-calcium carbonate and palladium-barium sulfate. Colloidal palladium may also be used as well as finely divided palladium on carriers such as silica gel, infusorial earth, alumina and other commonly used catalyst carriers. Because of these improved results, this method is applicable to large scale production with considerable decrease in the overall cost of production. Moreover my reaction catalyst has been found to be useful for the preparation of any of the unsymmetrical alkyl hydrazines. The following examples are provided to more clearly illustrate the invention:

*Example I.—Preparation of palladium charcoal catalyst*

1 part of 10% palladium charcoal and 10 parts of water was stirred in a hydrogen atmosphere until the catalyst was activated, that is, until no additional hydrogen was absolved.

*Example II.—Preparation of dimethyl hydrazine*

5 parts of nitroso dimethyl amine in 90 parts of water were added to the catalyst as prepared above and subjected to hydrogen atmosphere with rapid stirring. After a quantity equivalent to 2 moles of hydrogen had been absorbed the reaction was stopped, the catalyst filtered, and the water solution neutralized with hydrochloric acid. After evaporation of the water a yield equivalent to 81% of the theoretical of dimethyl hydrazine hydrochloride was isolated.

*Example III.—Preparation of ethyl methyl hydrazine*

5 parts of nitroso ethyl methyl amine in 90 parts of water were added to the catalyst as prepared in Example I and subjected to hydrogen atmosphere with rapid stirring. After an amount of hydrogen gas equivalent to 2 moles of hydrogen had been absorbed the reaction was stopped. The catalyst was filtered off and the water solution neutralized with hydrochloric acid. The water was distilled off and a theoretical yield of 79.2% ethyl methyl hydrazine hydrochloride was isolated.

In the same fashion simply by selecting the appropriate alkyl substituted nitroso amine and reducing it in accordance with the examples set forth above, any of the alkyl substituted hydrazines may be prepared.

The concentration of the catalyst has not been found to be critical, however, we have found that optimum results are obtained when the palladium-charcoal catalyst is present in an amount below 2.0% by weight. No appreciable differences where observed when amounts in excess of 2.0% were used, however, when amounts below 0.2% were used, a slight decrease in the rate of reaction was observed.

Any of the aforementioned catalysts may be used successfully in the performance of my invention. The palladium metal, itself, being the catalytic substance, is substantially unaffected by the particular carrier or means of introduction employed.

My process, as is evident, lends itself equally well to continuous or batch processes, hence is well adapted to commercial production of unsymmetrical hydrazine compounds.

I claim:

1. The method of preparing unsymmetrical lower alkyl hydrazines which comprises reducing a nitroso amine having the general formula:

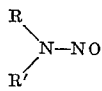

wherein R and R' are lower alkyl radicals, with hydrogen in aqueous solution in the presence of a hydrogen activated palladium metal catalyst.

2. The method of claim 1 wherein the hydrogen activated palladium catalyst used is a catalyst selected from the group consisting of palladium on charcoal, palladium on calcium carbonate, palladium on barium sulfate, colloidal palladium metal, and finely divided palladium metal a catalyst carrier.

3. The method of claim 1 wherein the catalyst used is hydrogen activated palladium on charcoal.

4. The method of claim 1 wherein the hydrogen activated palladium catalyst is present in an amount of from about 0.2% to 2.0% by weight.

5. The method of preparing unsymmetrical dimethyl hydrazine which comprises reducing nitroso dimethyl amine with hydrogen in aqueous solution in the presence of a hydrogen activated palladium metal catalyst.

6. The method of claim 5 wherein the catalyst used is hydrogen activated palladium on charcoal.

References Cited by the Examiner
UNITED STATES PATENTS 1,084,258  1/14  Ellis _____ 252—447

FOREIGN PATENTS 638,550  2/28  France.
797,483  7/58  Great Britain.

OTHER REFERENCES

Audrieth, The Chemistry of Hydrazine, pages 15 and 16 (1951), published by John Wiley and Sons, New York.

Blatt, Organic Synthesis, collective volume II, 1943, pages 211–213.

Ellis, Hydrogenation of Organic Substances, 3d edition, 1930, page 87.

Fieser et al., Advanced Organic Chemistry, 1961, page 281.

Fischer, Berichte, vol. 8, 1875, pages 1587–90.

Gilman, Organic Chemistry, vol. 1, 2d edition, 1943, pages 780, 781, 786, 787.

Groggins, Unit Processes in Organic Synthesis, 4th edition, 1952, pages 519, 520.

Paal et al., Chem. Berichte, vol. 63B, 1930, pages 57–66.

Paal et al., Chem. Ber., 63B, 65 (1930)

Grillot, J.A.C.S., vol. 66, 1944, p. 2124.

CHARLES B. PARKER, *Primary Examiner.*

WILLIAM G. WILES, LEON D. ROSDOL, R. L. CAMPBELL, HERBERT J. LIDOFF, *Examiners.*